United States Patent

Aurora

[11] Patent Number: 5,584,096
[45] Date of Patent: Dec. 17, 1996

[54] MULTIPLE HAND GRIP SYSTEM

[76] Inventor: Chander Aurora, 49 Horseley Hill Drive, Scarborough, Ontario M1B 1W4, Canada

[21] Appl. No.: 288,604

[22] Filed: Aug. 10, 1994

[51] Int. Cl.⁶ .................................... A47B 95/02
[52] U.S. Cl. ................ 16/111 R; 16/114 R; 16/DIG. 12
[58] Field of Search ............... 16/111 R, 114 R, 16/DIG. 12, DIG. 19; D8/303; 74/551.8, 551.9; 273/81 R, 81.4

[56] References Cited

U.S. PATENT DOCUMENTS

| | | | |
|---|---|---|---|
| D. 326,127 | 5/1992 | Rink | D8/303 |
| 2,666,340 | 1/1954 | Hunt | 74/551.9 |
| 2,704,668 | 3/1955 | Park, Sr. | 74/551.9 |
| 3,016,763 | 1/1962 | Albert | 74/551.9 |
| 4,785,495 | 11/1988 | Dellis | 16/111 R |
| 4,890,355 | 1/1990 | Schulten | 16/111 R |
| 5,190,267 | 3/1993 | Schmitt et al. | 16/111 R |

*Primary Examiner*—Chuck Y. Mah
*Attorney, Agent, or Firm*—Eugene J. A. Gierczak

[57] ABSTRACT

This patent invention relates to Multiple Hand Grip System. This system may be used to cover the hand support pipes which are located in transit buses, subway train cars, light rail transit cars, street cars, trams, trolley buses etc. The system includes generally a cylindrical body, having an inner and outer wall and opposite open ends and exterior gripping means. The system is molded from plastic material high coefficient of friction and moldability of the material result in non-slippery, convenient, comfortable friction, and safe, hand grips for both left and right hands of the users. The plastic material used to mold the system provides a good feel to touch and good friction with hand skin. The exterior gripping means of the system, conforms to the shape of users' left and right hands. It provides adequate support and retention of the users' hands even though the users relax their grips. The Multiple Hand Grip System when installed to cover a hand support pipe, overcomes the disadvantages of the hand support pipe. The system is a one piece molded unit. It is simple and economical to manufacture. It has a strong and rigid construction. It is light-weight and has a pleasing design appearance. It is environmentally safe, and is recyclable.

5 Claims, 4 Drawing Sheets

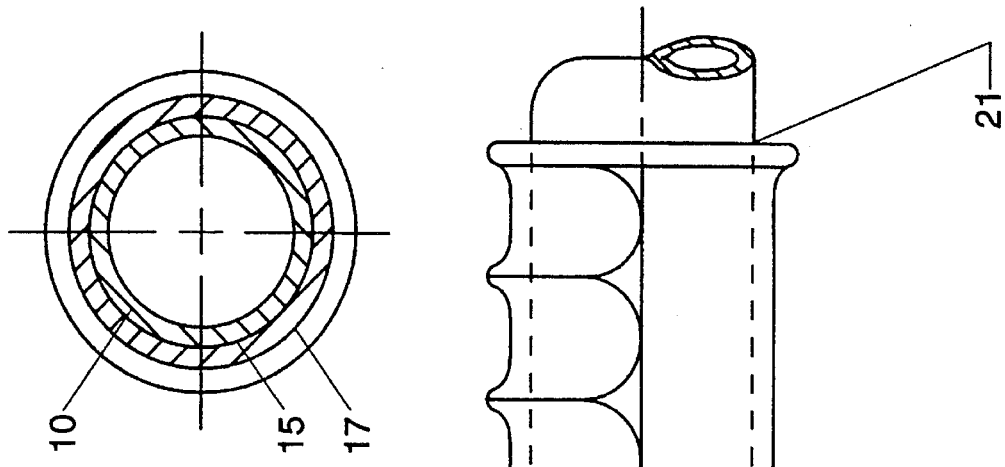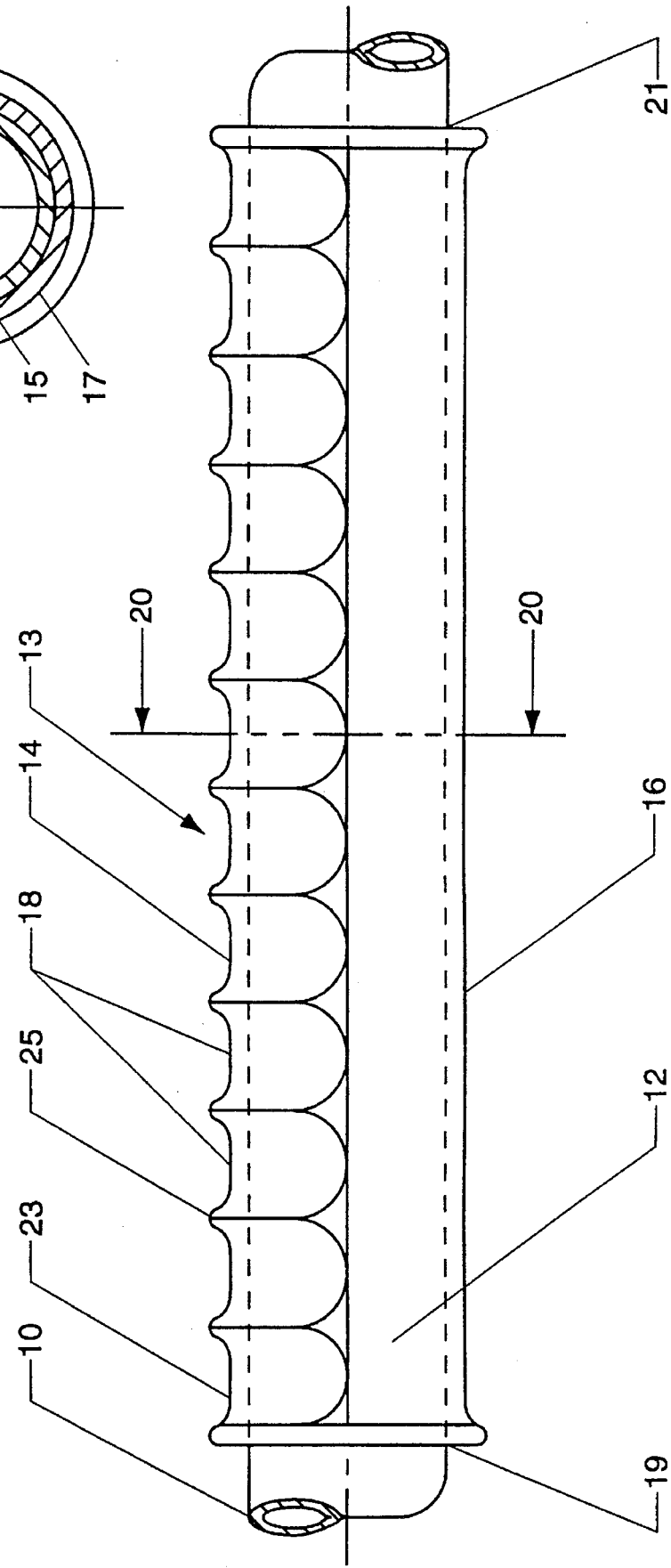

MULTIPLE HAND GRIP SYSTEM

FIELD OF INVENTION

This patent invention relates to Multiple Hand Grip System which when installed to cover a hand support pipe, provides non-slippery, convenient, comfortable friction, protective and safe, hand grips supports for users' hands.

BACKGROUND OF THE INVENTION

Various prior art devices have heretofore been devised such as those shown in U.S. Pat. No. 4,934,024 Sexton, I., U.S. Pat. No. 3,880,443 Tobin, U.S. Pat. No. 4,890,355, Schulten, U.S. Pat. No. 4,785,495, Dellis, and U.S. Pat. No. 4,617,697, David.

The hand support pipes are located in subway train cars, light rail transit cars, transit buses, trams, street cars, trolley buses etc. These hand support pipes are used for hand supports by users, while standing, or while sitting on their seats, or while climbing into a vehicle, or while getting down from a vehicle. The hand support pipes are slippery, inconvenient to hold on with bare hands, leave black steely spots on hands, cause fatigue of hand muscles. The hand support pipes are unsafe when the vehicle is in motion or when it takes turns. Especially the seniors and the children who while climbing into a vehicle, or while sitting on their seats, hold their hands onto the hand support pipes. When they try to stand up from their seats, they require convenient, comfortable and safe, hand grips support for their hands, but are subjected to slippery, uncomfortable, inconvenient and unsafe support for their hands. Their hand muscles become red, and feel fatigue and pain in their palms and fingers.

During rush hours, the subway train cars, transit buses etc., are full with people. People who are standing and have their hands on overhead horizontal hand support pipes, or are holding on to vertical support pipes near the seats and near the doors etc., are not safe. When a bus or a train is in motion or takes turns, due to slippery hand support pipes, people fall over one another and can get hurt. Due to these slippery overhead hand support pipes, the users' hands can also slip to the sharp metal t-joints of hand support pipes, and the sharp metal support brackets, installed to support hand support pipes from the vehicle ceiling, and can get cuts and bruises on their hands.

The disadvantages of the hand support pipes installed in vehicles, can be overcome by covering the full or a part of the length of a hand support pipe that is required for hands support, with Multiple Hand Grip System. The Multiple Hand Grip System can be used to cover the overhead horizontal hand support pipes or vertical and inclined hand support pipes, installed near the doors, the seats, and in the pathway of the vehicle, etc.

The Multiple Hand Grip System includes generally a cylindrical body, having an inner and outer wall and opposite open ends. The system is molded from plastic material. In the preferred embodiment, the plastic material used to mold the systems is of the quality equivalent to the plastic material used by major auto manufacturers, to manufacture other auto accessories. The plastic material used to mold the Multiple Hand Grip System, is such that its moldability, and its coefficient of friction, give superior, non-slippery, comfortable friction, protective and safe, hand grips for both left and right hands of the users. The most important requirement of the plastic material used to mold the system is that it provides a good feel to touch and good friction to hand skin.

The Multiple Hand Grip System is slided over to install tight fit over a hand support pipe. The length of each Multiple Hand Grip System is equal to that part of the length of a hand support pipe which can be used for hands support by users, or as requested by the owner/manufacturer of the vehicles. The length of hand support pipes, used for hands supports by users, will vary from one hand support pipe to another. Similarly the length of each Multiple Hand Grip System will vary accordingly. The Multiple Hand Grip System is molded to the contours of the fingers of the users' hands, over the complete length of the system, to provide comfortable friction, non-slippery, convenient, protective and safe hand grips support for both left and right hands of the users.

The hand grips include a series of alternating curvilinear recesses and ridges which conform to the fingers and spaces between the fingers of the users' hands. Thus the exterior gripping means of the system provides adequate support and retention of the users' hands even though the users relax their grips. The Multiple Hand Grip System is environmentally safe and is recyclable. The color of the plastic material used to mold the system, may be selected to please the users' eyes and the environment.

SUMMARY OF THE INVENTION

The invention, Multiple Hand Grip System, when installed to cover a hand support pipe, overcomes all the above noted disadvantages of hand support pipes. The system includes generally a cylindrical body, having an inner and outer wall and opposite open ends.

Several objects and advantages of the invention may be noted:

The provision of a Multiple Hand Grip System is for the support of both left and right hands of the users. When installed it covers that part of the length of a horizontal, a vertical, or an inclined hand support pipe, which can be used for hands support by the users. This system provides non-slippery, comfortable friction, convenient, protective and safe hands support for the users. The plastic material used to mold the system provides a good feel to touch and good friction with hand skin.

The provision of exterior gripping means, of the system, conforms to the shape of users' left and right hands. It provides adequate support and retention of the users' hands even though the users relax their grips. The hand grips include a series of alternating curvilinear recesses and ridges which conform to the fingers and spaces between the fingers of the users' hands.

The provision of the Multiple Hand Grip System is a one piece molded unit. It is simple and economical to manufacture. It has a strong and rigid construction. It is lightweight and has a pleasing design appearance. It overcomes all the disadvantages of hand support pipes. It is environmentally safe and is recyclable. Other objects and advantages of the Multiple Hand Grip System will become apparent from the following description.

DESCRIPTION OF THE DRAWINGS

These and other objects and features of the invention shall now be described in relation to the following drawings:

FIG. 1 is an elevational view of the Multiple Hand Grip System.

FIG. 2 is a sectional view taken along lines 20—20 of FIG. 1.

DESCRIPTION OF THE INVENTION

Figure 3:
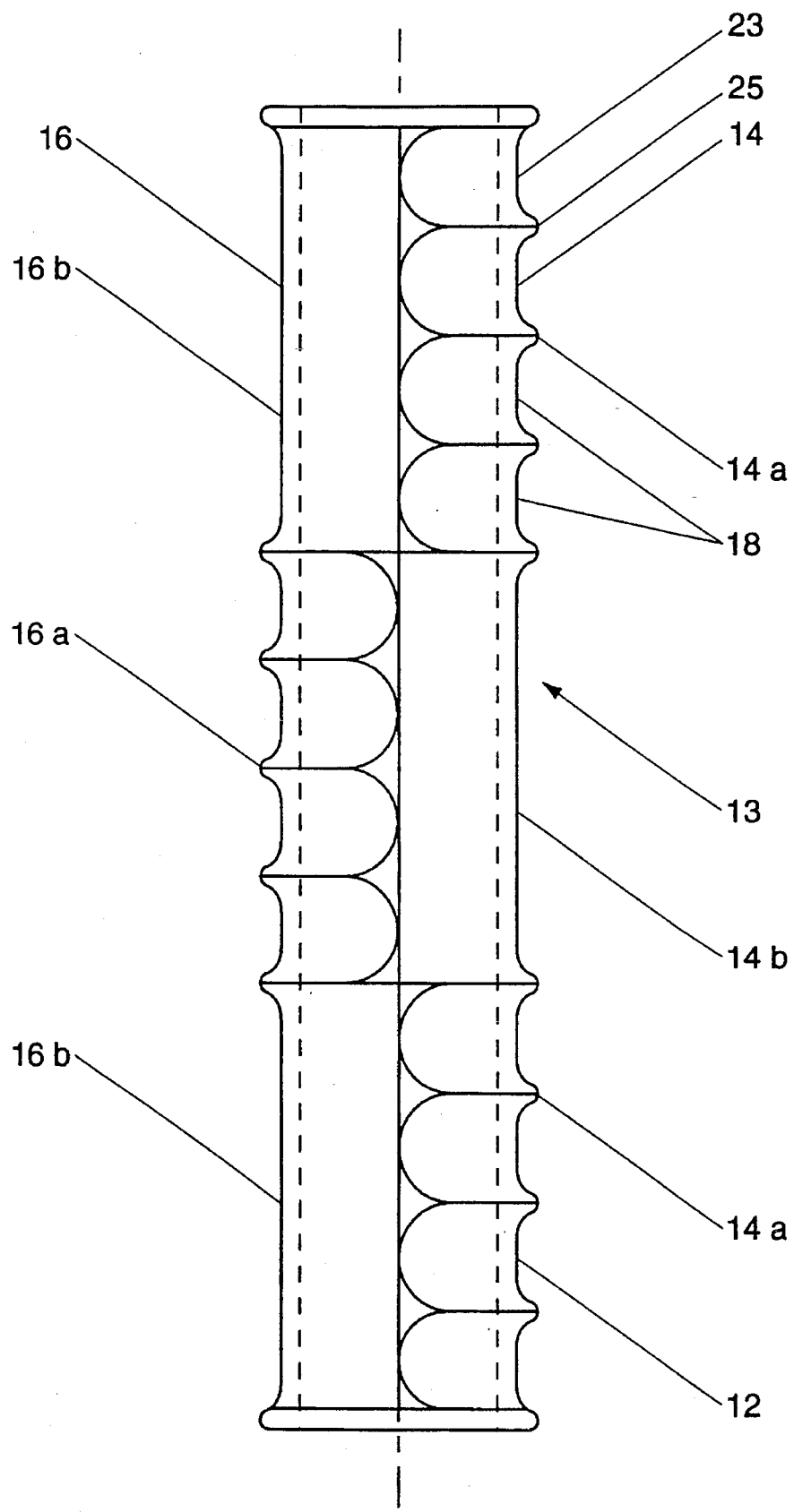
FIG. 3 is an elevational view of another embodiment of the Multiple Hand Grip System.

Like parts shall be given like numbers throughout the figures.

Various modifications may be made to the illustrated Multiple Hand Grip System as shown in different drawings.

Referring to FIG. 1 the system or hand grip 12 includes generally a cylindrical body 13. Cylindrical body 13 presents an inner wall or inner surface 15 and outer wall or outer surface 17 (as best illustrated in FIG. 2) and opposite, spaced apart, open ends 19 and 21 (as best illustrated in FIG. 1).

As seen in FIG. 1, the Multiple Hand Grip System or hand grip 12 presents a first surface 14 and a second, circumferentially opposed surface 16. First surface 14 presents a plurality of indentations 18. Each indentation 18 has a first arcuate surface oriented parallel with the longitudinal length of the hand support pipe or hand railing 10 and a second arcuate surface oriented generally perpendicularly relative to the first arcuate surface. The first arcuate surface is concave toward first surface 14, while the second arcuate surface is in convex relation to first surface 14. Indentations 18 are molded to correspond to the fingers of an adult human. Second surface 16 is substantially smooth along the longitudinal length of hand grip 12. The length of the system varies as the length of the hand support pipe 10 varies.

FIG. 2 shows a cross-sectional view of hand grip 12, and hand support pipe 10, of FIG. 1.

FIG. 3 illustrates another embodiment of the invention. In this embodiment, body portion 13 presents a first surface 14 and a circumferentially opposed second surface 16. First surface 14 presents longitudinally alternating ridged portions 14a and smooth portions 14b. Ridged portions 14a present a plurality of longitudinally spaced indentations 18. Indentations 18 are the same as the indentations described in relation to the first embodiment. Smooth portions 14b are substantially smooth along the length thereof. Second surface 16, like first surface 14, presents longitudinally alternating ridged portions 16a and smooth portions 16b. Ridged portions 14a are circumferentially opposed with smooth portions 16b. Likewise smooth portions 14b are circumferentially opposed with ridged portions 16a. This arrangement of alternating ridged and smooth portions enables users to grasp hand grip 12 with either their right or left hands. The length of the hand grip 12 varies as the length of the hand support pipe 10 varies.

Figure 4:
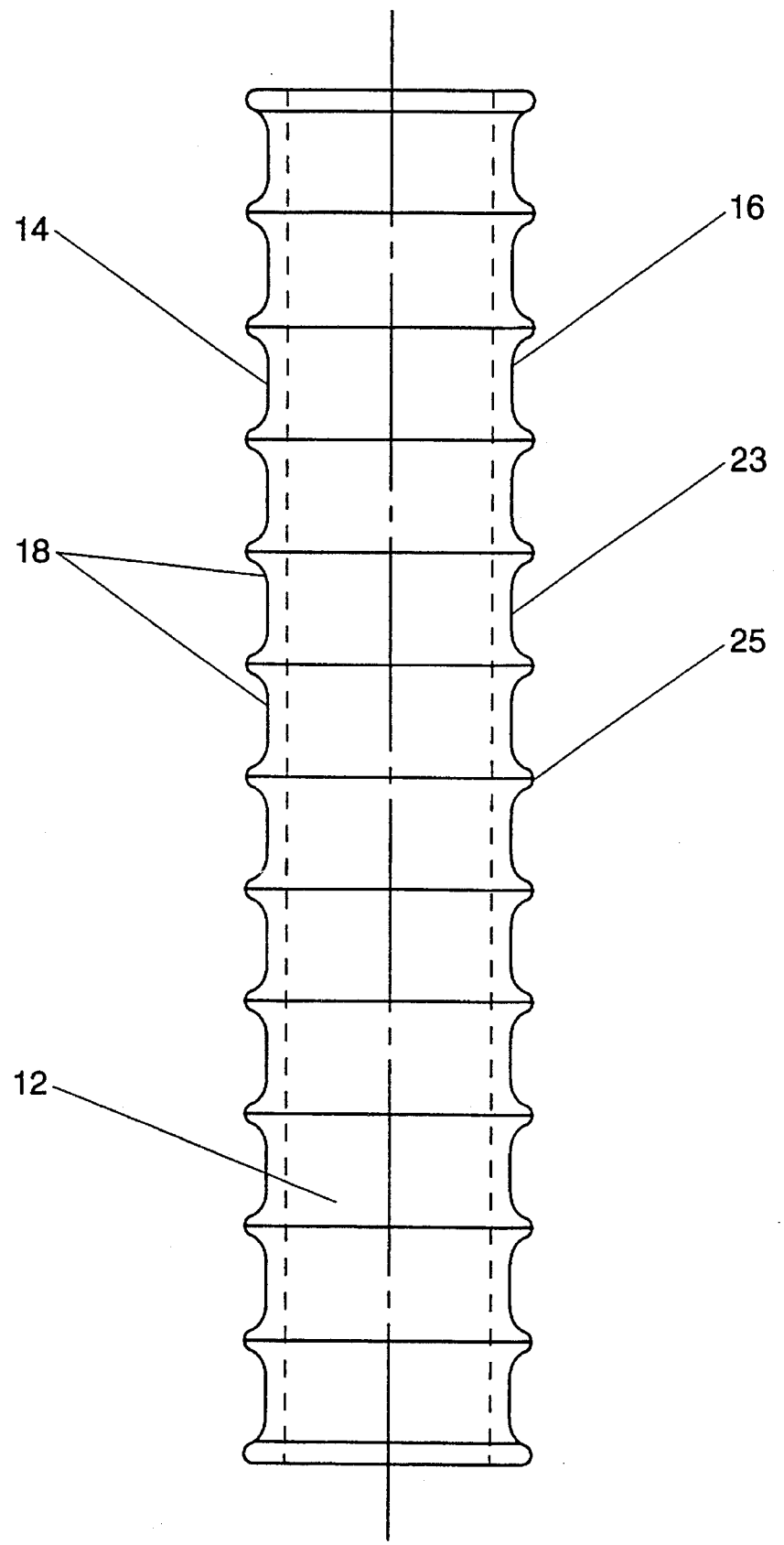
FIG. 4 is an elevational view of another embodiment of the Multiple Hand Grip System.

FIG. 4 illustrates yet another embodiment of the invention. In this embodiment the hand grip 12 presents a first surface 14 and a circumferentially opposed surface 16. First surface 14 and second surface 16 present indentations 18. The indentations 18 on first surface 14 are aligned with the indentations on the second surface. Each indentation 18 has a first arcuate surface oriented parallel with the longitudinal length of the hand support pipe or hand railing 10 and a second arcuate surface oriented generally perpendicularly relative to the first arcuate surface. The first arcuate surface is concave toward first surface 14, while the second arcuate surface is convex relation to first surface 14. The length of hand grip 12 is variable.

Figure 5:
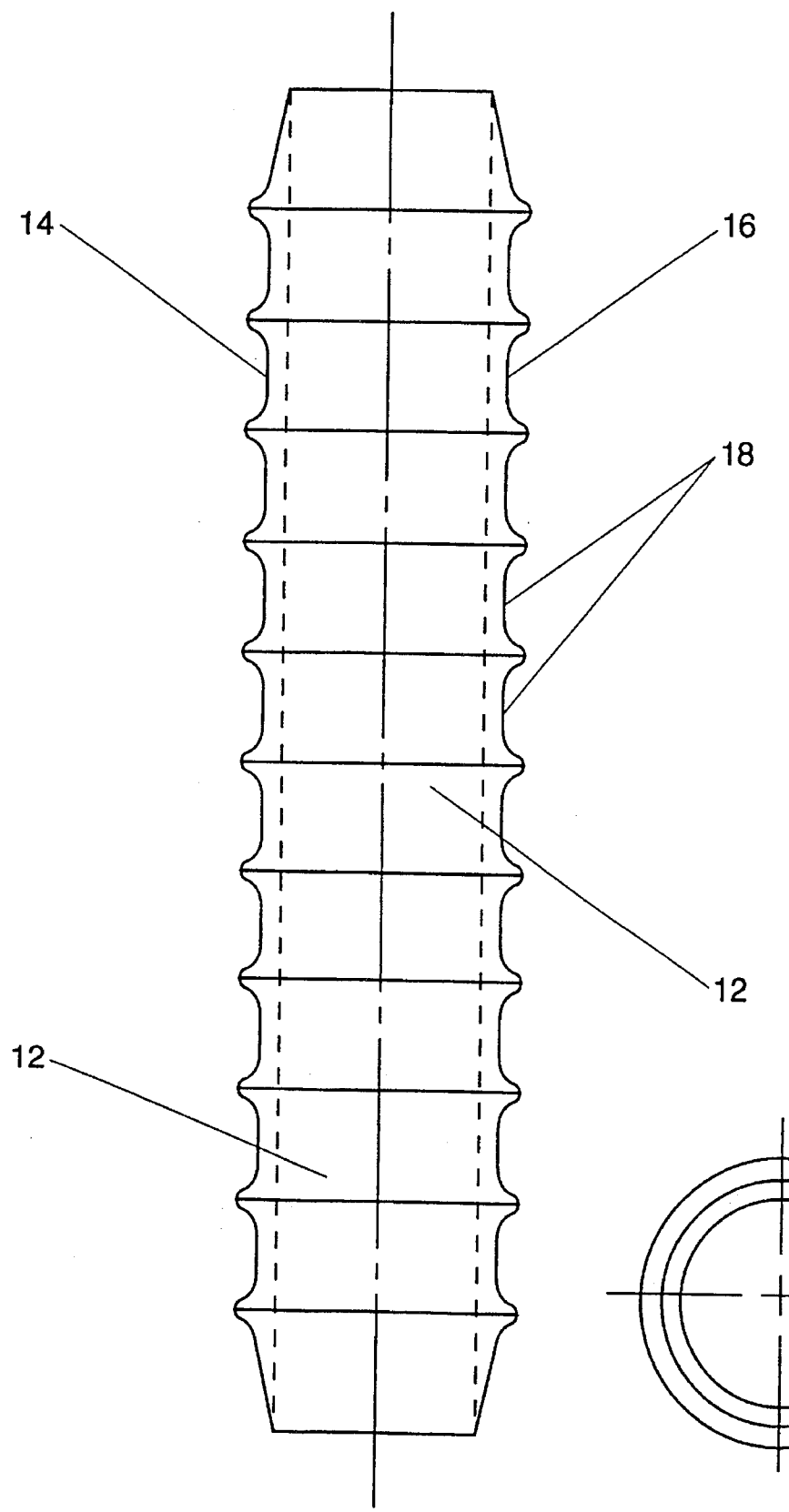
FIG. 5 is an elevational view of another embodiment of the Multiple Hand Grip System.

FIG. 5 depicts yet another embodiment of hand grip 12. The hand grip 12 shown in FIG. 5 is the same as that in FIG. 4, with the exception of only one difference: in the embodiment of FIG. 5 the ends 19 and 21 of hand grip 12 are tapered towards inner wall 15.

Figure 6:
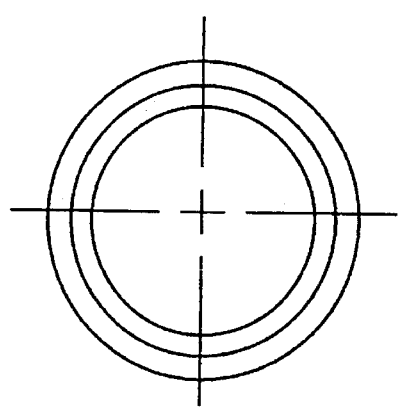
FIG. 6 is a plan view of Multiple Hand Grip System of FIG. 5.

FIG. 6 shows internal construction of hand grip 12, of FIG. 5.

Generally the hand support pipes 10, installed in the subway train cars, light rail transit cars, trams, street cars, transit buses etc., are of circular cross-section. Hand grip 12 is sized to be slided over hand support pipe 10. Therefore inner wall 15 embraces and forms a tight fit over the hand support pipe 10, and when screwed in a manner known to one skilled in the art hand grip 12 does not have any lateral or longitudinal movement over hand support pipe 10. The holes for metal screws in hand grip 12 are located such that they do not weaken the strength of hand grip 12. The screw heads stay at an appropriate level below the surface of hand grip 12, do not touch the users' hands and do not mar the design appearance of hand grip 12.

Hand grip 12 is molded in plastic material. The indentations 18 are sized to correspond to adult human fingers and are contoured to the fingers of the users' hands, over the complete length of the system to provide comfortable friction, non-slippery, protective and safe hand grips support for left and right hands of the users. Thus indentations 18 facilitate users' gripping thereof and also provide adequate support and retention of the users' hands even though the users relax their hands. The most important quality of the plastic material used in the preferred embodiment to mold the system is that it provides a good feel to touch and good friction to hand skin. To grasp the system the users use fingers of one of their hand or both hands and wrap their thumbs across the opposite side of the hand grip 12.

If it is more economical or if it is required due to circumstances, then an embodiment of hand grip 12, may be heated to an elevated temperature, in order to expand so that it may be slided over hand support pipe 10. Once installed, the heated hand grip 12 would allowed to cool at ambient temperatures. By using this method of installation, the use of metal screws may be avoided.

In another embodiment, hand grip 12 is molded in at least two lateral sections. The lateral sections are put across the length of a hand support pipe 10 to click together to form a circular hand grip 12. The hand grip 12 embraces and forms a tight fit over the hand support pipe 10 without any lateral or longitudinal movement over the length thereof. These longitudinal sections of the Multiple Hand Grip System may also use metal screws. Again this option may be used if it is more economical or if it is required due to other circumstances.

As noted above that various changes could be made in the design of the hand grip without departing from the scope of the invention. Any material other than plastic may be used which provides all and more than the required characteristics and qualities of the plastic material. The use of the hand grip is not limited to the hand support pipes located in vehicles only, it may be used where ever it is useful.

Thus the Multiple Hand Grip System provides relief from disadvantage of the hand support pipes. It provides safety. The system is a one piece molded unit. It is simple and economical to manufacture. It has a strong and rigid construction. It is light weight and has a pleasing design appearance. It is environmentally safe, and is recyclable.

It is intended that all matter contained in the above description or depicted in the accompanying drawings, shall be interpreted as illustrative and not in a limiting manner.

The embodiments of the invention in which an exclusive property or privilege is claimed are defined as follows:

1. A hand grip for a hand support pipe comprising:
   (a) an elongated body portion terminating in first and second spaced apart ends defining a longitudinal length of said body portion:
   (b) said body portion further having
      an inner surface for secure, frictional engagement with said hand support pipe;
      an outer surface presenting a first surface extending along said length and a second surface extending along said length circumferentially opposed to said first surface
      said first surface presenting alternating ridged portions and smooth portions along said length;
      said surface presenting alternating ridged portions and smooth portions;
      said ridged portions presenting a plurality of longitudinally spaced indentations to facilitate gripping of said hand grip;
      said ridged portions of said first surface being circumferentially opposed to said smooth portions of said second surface; and,
      said smooth portions of said first surface being circumferentially opposed to said ridged portions of said second surface.

2. A hand grip as in claim 1 wherein said body portion has a generally uniform cross-sectional configuration along the longitudinal length thereof, said cross-sectional configuration corresponding to a circular shape.

3. A hand grip as claimed in claim 1 wherein said indentations include a concave portion and a convex portion relative to said longitudinal length of said body portion.

4. A hand grip as in claim 3 wherein said hand grip is releasably mountable on said hand support pipe.

5. A hand grip as in claim 4 wherein said hand grip comprises moulded, rigid plastic.

\* \* \* \* \*